United States Patent
Willis et al.

(10) Patent No.: US 6,346,689 B1
(45) Date of Patent: Feb. 12, 2002

(54) CELL AND METHOD FOR FORMING A COMPOSITE HARD MATERIAL AND COMPOSITE HARD MATERIALS FORMED THEREBY

(75) Inventors: Paul Edwin Willis, Curtain; Alan Major, Higgins; Donald Lindsay Clark, Gastlecrag, all of (AU)

(73) Assignee: The Australian National University, Acton (AU)

( * ) Notice: Subject to any disclaimer, the term of this patent is extended or adjusted under 35 U.S.C. 154(b) by 0 days.

(21) Appl. No.: 09/554,477

(22) PCT Filed: Nov. 12, 1998

(86) PCT No.: PCT/AU98/00940

§ 371 Date: Jul. 19, 2000

§ 102(e) Date: Jul. 19, 2000

(87) PCT Pub. No.: WO99/25468

PCT Pub. Date: May 27, 1999

(30) Foreign Application Priority Data

Nov. 14, 1997 (AU) .............................................. PP0402

(51) Int. Cl.[7] .............................. B01J 3/06; C01B 35/14; F27B 5/04
(52) U.S. Cl. .......................... 219/407; 219/385; 51/293; 51/307
(58) Field of Search ........................ 219/385, 391–393, 219/399, 405, 407; 51/293, 295, 297, 307, 309; 175/374, 428, 434; 428/408, 704; 419/10, 12, 14, 48, 51, 52

(56) References Cited

U.S. PATENT DOCUMENTS

| 4,525,178 A | * | 6/1985 | Hall .............................. 51/309 |
| 4,536,442 A | * | 8/1985 | Bovenkerk et al. .......... 428/323 |
| 4,604,106 A | * | 8/1986 | Hall .............................. 51/293 |
| 4,985,051 A | * | 1/1991 | Ringwood ....................... 51/30 |
| 5,199,832 A | * | 4/1993 | Meskin et al. ............... 175/434 |
| 5,512,235 A | * | 4/1996 | Cerutti et al. .................. 419/10 |
| 5,516,481 A | * | 5/1996 | Ishizaki et al. ............... 264/13 |
| 5,560,754 A | * | 10/1996 | Johnson et al. ............... 51/297 |
| 5,662,720 A | * | 9/1997 | O'Tighearnaigh ............ 51/295 |

FOREIGN PATENT DOCUMENTS

| DE | 3843004 | * | 2/1990 |
| GB | 1596280 | * | 8/1981 |
| JP | 63-7832 | * | 1/1988 |
| RU | 2048187 | * | 11/1995 |
| WO | 9217618 | * | 10/1992 |

* cited by examiner

*Primary Examiner*—Joseph Pelham
(74) *Attorney, Agent, or Firm*—Fish & Richardson P.C.

(57) ABSTRACT

A cell for forming a composite hard material and hard materials and methods of forming composite hard materials. A cell (10) in which the article is formed includes a talc outer sleeve (12), a glass sleeve (14) and a reflecting foil (22). A heater (18) is arranged inwardly of the foil (22) and a barrier layer (16) is arranged inwardly of the glass sleeve (14). A central column (20) is defined for receiving the charge of material (50) from which the hard composite material is to be formed. The charge material is located in a mold (76, 100) which can define the final shape of the article thereby avoiding the need for additional machining, and the mold and charge material are subject to high temperature and pressure to form the composite material while maintaining the charge subject to hydrostatic pressure during the application of pressure and high temperature and maintaining a low temperature gradient across the charge during formation of the composite hard material to reduce uneven pressurization of the composite hard material. The article may also be formed by forming first and second mixtures (120, 130) of composite hard material so as to form an outer surface on the article which has a higher hard particle content than an interior core portion of the article.

28 Claims, 3 Drawing Sheets

CELL AND METHOD FOR FORMING A COMPOSITE HARD MATERIAL AND COMPOSITE HARD MATERIALS FORMED THEREBY

This invention relates to a composite hard material and to a cell for forming a composite hard material and to methods for forming the composite hard material as well as articles formed from hard materials.

Our earlier international patent application Nos. PCT/AU88/00058, PCT/AU85/00271 and PCT/AU92/00127 disclose methods of forming polycrystalline diamond composite hard material (PCD) and polycrystalline cubic boron nitride hard material (PCBN). International application PCT/AU88/00058 also discloses a cell for forming the hard material.

Current commercial production of PCD's and PCBN hard materials is performed in triaxial, belt and girdle or similar apparatus at pressures of at least 50 Kb. These apparatus yield products with the geometric configuration of wafers or discs that are optionally bonded to carbide substrates during the fabrication process. These shapes are not optimum for certain hard-rock and mining operations and further machining and cutting to shape of the discs or bonded composites can be needed. This adds to final costs.

A first aspect of the invention concerns forming shaped pieces of hard material which can be used without major EDM finishing. Conventional techniques for forming composite hard material generally yield a disc or cylinder shaped piece of material. The disc or cylinder is not perfectly symmetrical and generally the finished piece is machined from the disc or cylinder by laser cutting or an EDM process. For example, if it is desired to form tips for a mining machine, a cylinder of hard material is produced and the cylinder is then subject to EDM processing to form the dome or conical shaped tip. The EDM processing ensures that the hard material is formed into the required shape. EDM finishing adds significantly to the time taken to produce the finished product and also the cost of the finished product.

This first aspect of the invention may be said to reside in a method for producing a hard composite material, including:
  locating a charge of material in a mould having at least one shaped cavity having the shape of a finished product;
  subjecting the mould and the charge of material to high temperature and pressure to form a composite hard material; and
  maintaining the charge subject to essentially quasi-hydrostatic pressure during the application of pressure and high temperature.

By maintaining the charge under quasi-hydrostatic pressure and at low temperature gradient, the final shape of the product is determined by a predicted mould form which results in the required product size and shape and therefore product of the required shape can be produced in the forming process without the need for substantial EDM finishing. This therefore reduces costs and time taken to produce a finished article from the composite hard material.

Preferably the method further includes maintaining a low temperature gradient radially and axially across the charge during formation of the composite hard material to reduce internal stresses that might result in delamination.

Preferably the charge is maintained at a substantially low temperature gradient during formation of the hard material.

Preferably the mould having the shaped cavity is formed from graphite or similar material and a plurality of shaped cavities are formed in the mould.

Preferably the shaped cavities are dome shaped or cone shaped for the formation of tips for a mining machine.

Preferably the shape composite hard material is formed in a cell as described below.

The second aspect of the invention may be said to reside in a cell for forming a composite hard material, including:
  a cell wall defining a central region for receiving the composite hard material;
  the cell wall having;
    (a) a ductile wall member;
    (b) a heater for providing heat energy when electrical current is applied to the heater;
    (c) means for maintaining a substantially low temperature gradient throughout the central region in which composite hard material is formed;
    (d) a water barrier wall arranged inwardly of the ductile wall member and heater; and
    (e) a barrier layer arranged inwardly of the water barrier wall for preventing intrusion of material from which the water barrier wall is formed into the composite hard material during formation of the composite hard material.

By maintaining a substantially low temperature gradient within the central region of the cell the material produced has lower residual stress that resits delamination and fracture.

Preferably the means for maintaining a substantially low temperature gradient comprises a metal reflector formed from high melting point metal material arranged between the ductile wall member and the water barrier wall for reflecting radiant energy from the heater and also conducting heat energy axially towards ends of the cell.

Preferably the means for maintaining a substantially low temperature gradient may also includ graphite spacers within the central region in which the hard material is located to alter the current density and improve thermal conductivity axially from the central region thereby aiding in the reduction of the thermal gradient caused by heater damage and by thermal conductivity.

Preferably the water barrier wall comprises a glass wall which also serves to enhance even pressure distribution and create a quasi-hydrostatic environment within the cell.

Preferably the heater comprises a high melting point material such as graphite or molybdenum.

Preferably the barrier layer comprises titanium foil or similar material.

Preferably the ductile wall is formed from talc or other material which provides good thermal and electrical insulation. The ductile wall also assists in creation of the hydrostatic environment within the cell to ensure even pressure distribution over the hard material during formation of the composite material.

This aspect of the invention also provides a method of forming a composite constituents into a cell as described above and applying electric current to the heater to heat the charge and applying pressure to pressurise the charge to thereby form the composite hard material.

A third aspect of the invention may be said to reside in a method for forming a composite hard material, including:
  locating a charge of constituents of the composite material in a cell for the formation of the composite hard material;
  increasing the temperature of the charge and subjecting the charge to pressure to form the composite hard material; and
  reducing the pressure quickly after formation of the composite hard material whilst maintaining a high temperature.

Preferably the pressure is elevated to about 25 Kb during the formation of the composite hard material and the pressure is pressure is reduced rapidly from about 25 Kb to ambient pressure in about four minutes.

Preferably the temperature of the charge is raised to approximately 600° C. and pressure is increased to 6 Kb. The temperature and pressure are then increased simultaneously to a temperature of 1050° C. and a pressure of 10 Kb. The temperature is then held and pressure is raised to a maximum pressure of about 25 Kb. At 25 Kb pressure, the temperature is slowly raised to the sintering temperature and held for a predetermined period after which the temperature is again ramped slowly to 800° C. Once this temperature is stabilised, the pressure is then reduced to the ambient pressure over a period of about 4 minutes. At about 0.5 to 1 Kb, the pressure release is slowed and the temperature ramped to ambient slowly over about 8 minutes.

A third aspect of the invention concerns the structure of the hard composite material articles.

This aspect of the invention provides a composite hard material article, including:
- a body having a variable microstructure, said microstructure being represented in an outer surface and an interior core, the body being formed from composite hard material including hard particles; and
- the body having a surface layer at the outer surface which has a higher hard particle content than the interior core thus forming a more closely packed hard particle network in the surface layer than in the interior core of the body.

This aspect of the invention also provides a method of forming a hard material article, including the steps of:
- loading a charge of hard composite material including hard particles into a mould, the mould substantially defining the outer surface shape of the article;
- applying temperature and pressure to the charge of material in the mould in such a manner so as to form at the outer surface a surface layer which includes a hard particle content greater than that of an interior core portion of the article thus forming a more closely packed hard particle network in the surface layer than in the interior core of the article.

The formation of the outer surface having the higher hard particle content provides significant advantages in that the outer surface of the article is provided with an increased hardness and improved wear performance compared to articles formed from the same material wherein the outer surface and interior core have a substantially homogenous hard particle content.

The composite hard material may be polycrystalline diamond composite hard material in which the hard particles are formed from diamond, or polycrystalline cubic boron nitride hard material wherein the hard particles are formed from the cubic boron nitride.

Preferably the application of temperature and pressure to the charge of material includes the steps of:
- locating the mould containing the charge into a cell;
- initial application of pressure and temperature causing load to be transmitted to the mould located in the cell to cause initial axial shortening of the cell to in turn cause pressure increase resulting in a reduction in the height of the mould;
- further increasing pressure and temperature to create a quasi-hydrostatic pressure environment within the cell to create relative uniform compression of the material;
- further increasing pressure so that the material is progressively densified firstly by compaction of the surface that is in contact with the mould and then progressively inward to the centre of the charge;
- causing a pressure gradient to be generated within the charge thus producing comparatively lower compaction towards a central region of the charge; and
- further increasing temperature to allow the bonding agent to react with the hard material particles and form a bonding matrix.

In one embodiment the charge has:
- a first mixture having hard material particles and a second mixture having finer hard material particles;
- and the method further includes packing the first mixture into the mould so as to be adjacent the mould surface to define a cavity which will define the interior core of the article;
- filling the cavity with the second mixture containing the finer hard particles; and
- placing the mould including the first and second mixtures into the cell and applying pressure and temperature to form the article.

In a further embodiment of the invention the hard material particles are diamond and the bonding agent is silicon. An additional quantity of silicon in the form of a wafer with similar diameter to the mould is placed on the flat face of the mould. During the final high temperature step the silicon wafer melts and penetrates the composite further reacting with the diamond particles to form additional silicon carbide bonding matrix.

In a further embodiment penetration of the body by additional molten silicon is not uniform but is preferentially concentrated in the core. The composite thus produced exhibits a microstructure in which the domed surface layer is relatively enriched in diamond and the core is relatively deficient in diamond and possesses an enhanced matrix content. This microstructure confers practical advantages in improving tip lifespan for mining operations.

In another embodiment of this invention the charge has a first mixture having hard material particles and a second mixture having fewer hard material particles and the method further includes packing the first mixture into the mould so as to be adjacent to the mould surface to define a cavity which will define the interior core of the article.

As polycrystalline diamond composites posses relatively low tensile strength and low fracture resistance, the above aspects of the invention enhance and improve these material properties. The laminated/layered feature caused by the diamond concentration effect of the moulding process and cycling technique offer benefits with regard to tool performance in certain mining applications. Due to the higher diamond content of the outer surface of the tool, increases in ultimate wear resistance will be achieved thus prolonging tool life. Other benefits of the diamond layering referred to above will be an improvement in impact resistance and higher bulk strength, thus tool chipping and other damage caused as a result of violent contact or shock when in service will be reduced.

A preferred embodiment of the invention will be described, by way of example, with reference to the accompanying drawings in which.

Figures 1, 2:
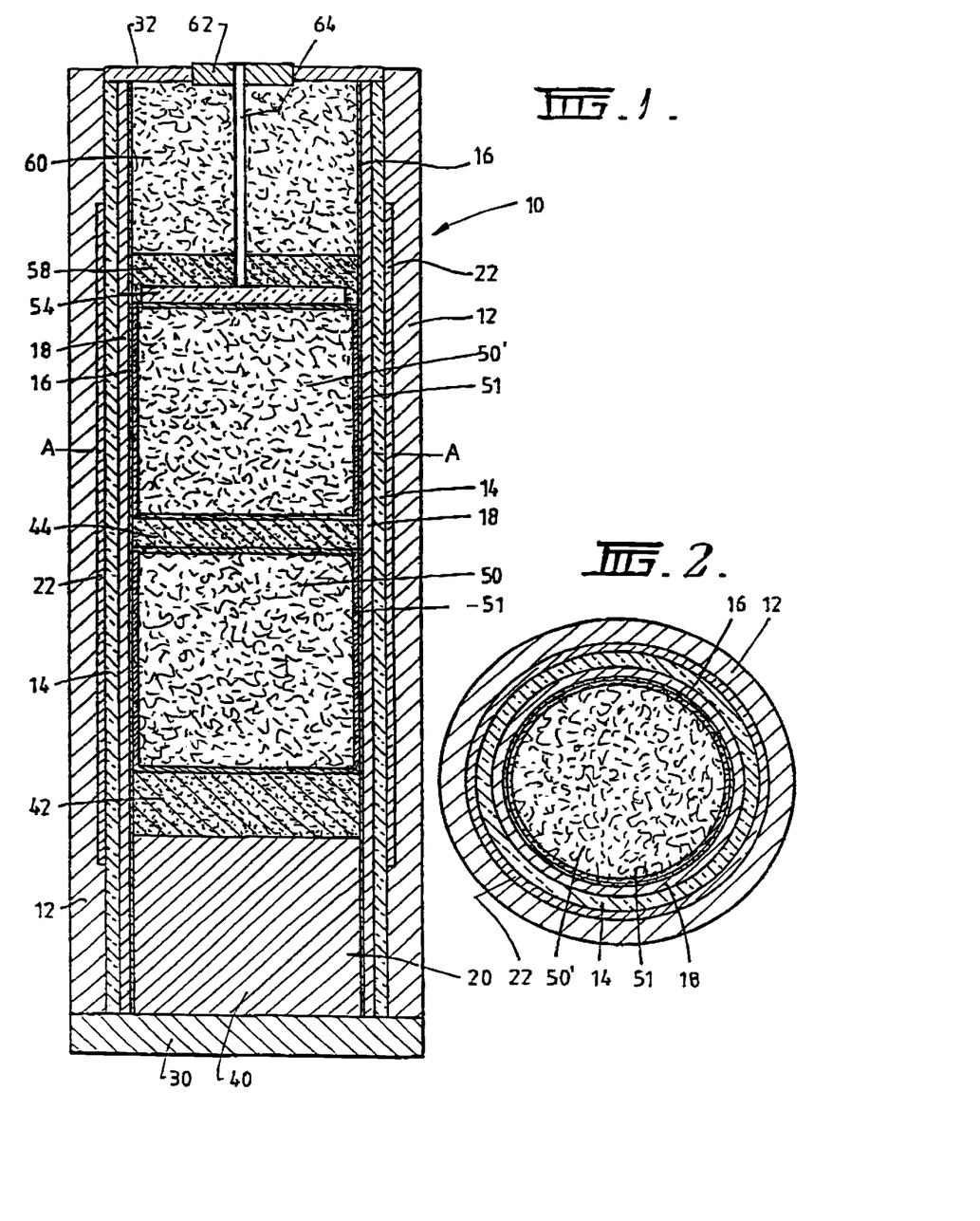
FIG. 1 is a cross-sectional view through a cell embodying the invention.
FIG. 2 is a cross-sectional view along the line A—A of FIG. 2.

With reference to FIG. 1, a cell 10 is shown which has an outer sleeve 12 formed of ductile material such as talc. As is clearly shown in FIG. 2, the sleeve 12 is circular in cross-section and the cell is cylindrical in shape. A glass sleeve 14 is arranged within the outer sleeve 12. A heater 18 is arranged inwardly of the glass sleeve 14. A barrier layer 16 of titanium foil si arranged inwardly of the heater 18 and generally forms the innermost peripheral wall of the cell defining a central column 20.

A metal reflecting foil 22 is arranged between the glass sleeve 14 and the outer talc sleeve 12.

Both the titanium foil barrier layer 16 and the metal reflecting foil layer 22 extend longitudinally so as to overlap the charge of material or charges of material in the cell from which the hard composite material is to be formed.

The cell 10 has a graphite base 30 and a graphite top or lid 32.

Arranged within the central column 20 is a lower pyrophyllite or similar filler 40. A graphite disc 42 is arranged on the filler 40 and a first charge 50 of the materials from which the hard composite material is to be formed is located on the graphite spacer 42. A central graphite spacer 44 is arranged above the charge 50 and a second charge 50' is arranged on the spacer 44. A layer 54 of AL203 is located within a further graphite spacer 58 and is located above the layer 54. A top filler 60 of pyrophyllite material is arranged in the upper portion of the cell 10. A pyrophyllite plug 62 is arranged in the lid 32 and the plug 62 and top filler 60 has a bore 64 for receiving a temperature probe for monitoring the temperature within the cell 10.

The talc sleeve 12 provides a ductile outer sleeve for assisting in the establishment of quasi-hydrostatic pressure within the cell 10 and also provides good thermal and electrical insulation. The inner glass sleeve 14 provides a water barrier and also enhances even pressure distribution within the cell 10 to further assist in establishing the quasi-hydrostatic environment within the cell 10. The titanium foil layer 16 provides a barrier to glass intrusion from the glass sleeve 14 during formation of the composite hard material during which high temperature and pressures are applied to the charges 50 and 50' so that the glass particles do not flow into the charge during formation of the hard composite material. Titanium foil layer 16 also acts as an "oxygen getter" when heated so as to prevent oxidation of the charge during application of high temperature and pressure.

The metal reflecting foil 22 is a high melting point material such as molybdenum, tungsten, tantalum or alloys such as stainless steel and acts to reflect radiant energy from the heater 18 back towards the charges 50 and 50' and also conducts heat axially towards the ends of the cell 10. Thus, the metal reflector 22 reduces the axial temperature of a substantially low radial and axial temperature gradient throughout the charge 50 and 50'.

The graphite spacers 42, 44 and 58 also reduces the axial and radial temperature gradient within the cell 10 due to the good thermal conductivity, and stability at temperature of the graphite material which the spacers are formed. These spacers also provide stability for the central column above and below the charge volume thus reducing deformation of the heater 18 and subsequent thermal aberrations. The graphite spacers 42, 44 and 58 can also alter the current density at selected areas thereby aiding in the reduction of the thermal gradient to maintain a substantially low thermal gradient across the charges 50 and 50'.

The metallic reflecting foil 22 therefore primarily acts as a thermal reflector which returns radiant heat from the heater 18 back into the cell 10. The foil 22 also, to some degree, conducts heat energy longitudinally towards the ends of the cell thus reducing the temperature gradient by conductance. The benefits of the metal reflecting foil 22 are therefore two-fold, energy conservation due to reduction of heat loss from the cell 10 and resultant reduction of the temperature gradient within the hot region of the cell 10 at which the charges 50 and 50' are located. In addition, a more uniform heat is applied to the outer sleeve due to thermal conductants of the foil 22 which in turn allows for more even and controlled deformation or compaction of the cell assembly.

The graphite spacers 42, 44 and 58 provide the further advantage of strength during elevation of temperature and thus during the pressure/temperature cycle, the effects of ductile flow of the fillers is minimised. This results in a post-cycle cell which displays little brittle failure and consequently cycle failures with the cell according to the preferred embodiment of this invention will be uncommon.

A further advantage of the pressure cell is that composite bodies produced therein are subjected to reduced differential stress during recovery and delamination is thereby minimised.

The charge 50 and charge 50' are encased in a capsule 51 formed from boron nitride or graphite and in the embodiment shown in FIGS. 1 and 2, the charge is generally cylindrical in configuration.

Figure 3:
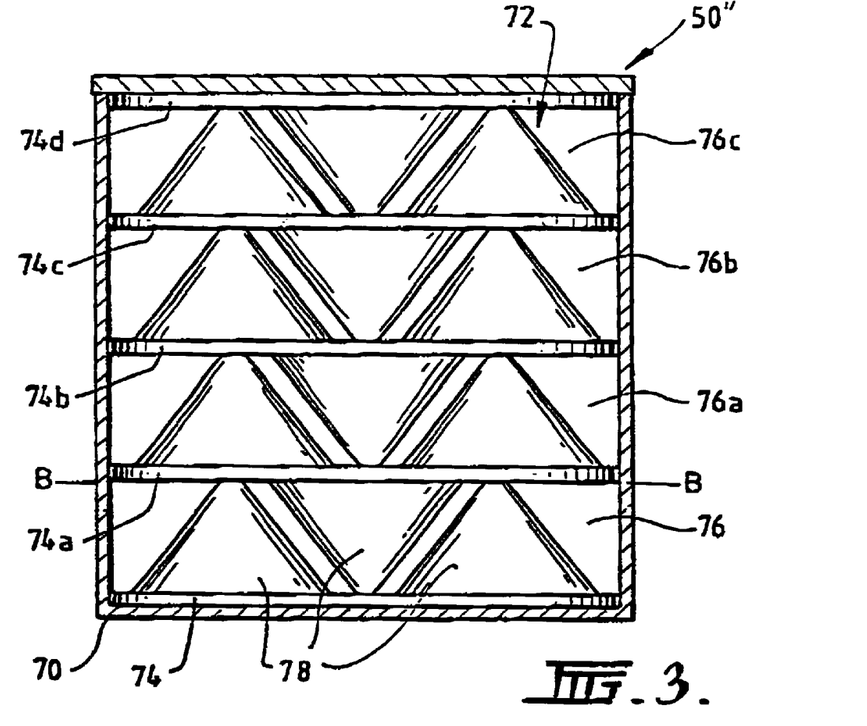
FIG. 3 is a cross-sectional view through a shaped mould according to one embodiment of the invention.
Figure 4:
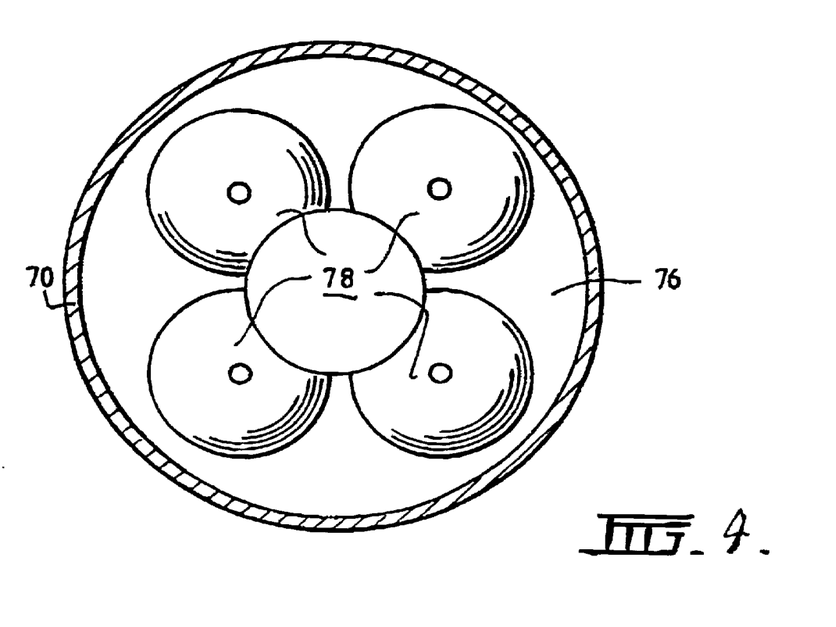
FIG. 4 is a cross-sectional view along the line B—B of FIG. 3.

FIGS. 3 and 4 show a cross-section through a charge 50" which can be located within the cell 10 of FIGS. 1 and 2.

The charge 50 ' comprises a cylindrical capsule 70 of hexagonal boron nitride or graphite material which encompasses a charge volume 72. Located within the charge volume 72 (FIG. 3) is a first layer 74 of silicon in the form of a silicon disc. A graphite mould 76 is located on the disc 74 and includes a series of cone-shaped cavities 78. In the embodiments shown, the graphite mould 76 has five cavities 78 as best shown in FIG. 4. The cavities 78 are filled with feedstock from which the composite hard material is to be formed. The feedstock according to this embodiment of the invention is preferably diamond plus silicon powder mixture for producing a PCD hard material. However, PCBN feedstock could also be used if desired in which case the silicon discs 74a etc would be omitted. A further silicon disc 74a is located on the graphite mould 76 and a further graphite mould 76a is arranged on the silicon disc 74a. Two further disc and mould arrangements labelled 74b and 74c and 76b and 76c are also provided within the capsule 70. A top silicon disc 74d is arranged on the top mould 76c.

In the preferred embodiment shown in FIG. 4, 20 preshaped articles, such as tips for a mining machine, can be produced from the charge 50'.

During the application of heat when at pressure, the silicon material from the silicon layers 74, 74a, 74b, 74c and 74d penetrate into the diamond silicon feedstock within the mould cavities and reacts to bind and form the PCD hard material.

Because of the quasi-hydrostatic pressure and low temperature gradient which is maintained within the cell 10 as described with reference to FIGS. 1 and 2, the shape of the cavities in the mould 76 are minimally distorted and a pre-shaped formed hard material is produced which has the required shape for use as a tip in a mining machine without the need for any substantial EDM finishing. Thus, the time taken to produce the finished tip and the cost involved is much less than prior art techniques which require the EDM machining of a generally cylindrical block of material in order to form the tip.

The graphite or like material from which the mould 76 is formed has a ductile nature and should be relatively inert. It should also have good thermal conductivity and stability at high temperatures. The mould 76 may be formed from graphite material as mentioned above but may also be formed from hexagonal boron nitride which is the same material from which the capsule 70 is formed.

The ductile nature of the outer talc sleeve 12 and the mould material 76 ensures quasi-hydrostatic pressure is applied to the cavity 78 and therefore the charge material within the cavities to ensure that even pressure is applied all around the charge material to maintain the shape of the cavities and therefore the charge material during application of temperature and pressure. The resultant products produced from the cavities 78 after sintering closely represent the shape of the original cavities 78 in the mould 76 but are of full density.

Examples of forming cones for a mining tool using a cell of the type described above and the method described above will now be described.

EXAMPLE 1

A mixture comprising 80 percent of 40–60 micron and 20 percent 10–20 micron diamond was prepared. This mixture was further intimately mixed with 1–2 micron silicon powder and silicon nitride powder in the proportions by weight comprising 90 percent diamond to 9.5 percent silicon and 0.5 percent silicon nitride.

Two cylindrical moulds of hexagonal boron nitride with preformed, conical shaped recesses were prepared. The circular opening diameter of these conical recesses was 10 mm and their depth was 9 mm, the tapering sides of which formed an included angle of 65 degrees.

The diamond—silicon mixture was then packed into the recess and finally, when the recess was largely filled a silicon disk of 10 mm diameter was placed into this recess so as to bring the filled recess flush with the surface of the mold.

The resultant charged moulds were placed into a pressure cell of the type described with reference to FIGS. 1 and 2 but of smaller size to facilitate exemplifying the invention rather than producing commercial product, and subjected to high temperature and pressure in a piston cylinder apparatus.

The temperature of the cell and diamond—silicon charge was raised to 600 degrees centigrade and the pressure was slowly elevated to 6 Kb. The temperature and pressure were then raised simultaneously to a temperature of 1050 degrees C and a pressure of 10 Kb. The temperature was then held and the pressure raised to 25 Kb. Once at pressure the temperature was then raised slowly to 1500 degrees C and held for 15 minutes. The temperature was then decreased and held at a level of 800 degrees. C, the pressure was then released to ambient conditions over 4 minutes. Temperature was then lowered over 8 minutes to a room temperature.

After the cycle was complete the cell was removed from the apparatus and the samples examined. The mixture was found to have formed into a well consolidated, conical shaped diamond compact, which displayed good mechanical properties. The density of the so formed, shaped compact was 3.40 gms/cc.

The cone was then cut vertically from its apex through to approximately centre of its base using an EDM machine. One half was prepared by polishing to observe the microstructure of the material. Observations using an optical miscroscope of this polished surface indicated that a layer of higher diamond concentration about 0.5 mm in thickness had been formed over the surface of the cone during the process. This layer was intimately connected to the mass beneath with no evidence of microcracking or delamination. Further observations were carried out using a Scanning Electron Microscope; these observations confirmed the above results.

The second half of the cone was subsequently broken; it processed excellent impact strength and hardness. When broken, the fractures were found to extend through the diamond crystals, showing the strength of the diamond—silicon carbide bonding. Subsequent x-ray analysis showed that the silicon to silicon carbide reaction was almost complete, only 1–2 percent of unreacted silicon an approximately 1 percent graphite being present after the reaction.

In subsequent abrasion test against hard rock cones made using the above procedure proved to be highly wear resistant and able to absorb high impact or shock loads.

Figure 5A:
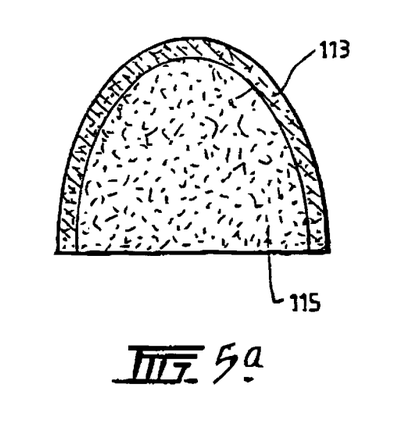
FIGS. 5a and 5b are cross-sectional views illustrating diamond composite bodies formed of cone and dome shape according to one embodiment of the invention.
Figure 5B:
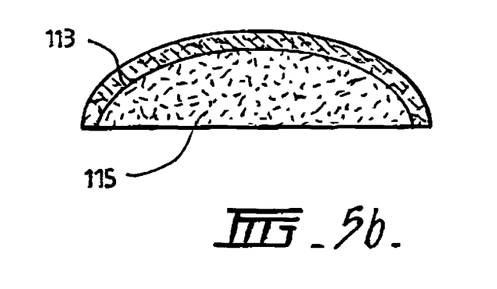

An unexpected benefit of the moulding process described with reference to Example 1 is the improved surface structure of the cast article. The surface layer 113 of the final article displays a higher diamond to SiC content thus forming a surface that is differentiated from the interior by a more closely packed diamond network as shown by the cast articles of FIGS. 5a and 5a. This feature is progressively generated as a result of this application of uniform pressure about the mixture during the densification procedure resulting in diamond within the surface layer of the charge become more closely packed than within the interior. This process can be best explained in stages.

Stage 1

Application of pressure and temperature during the early stages of the cycle that is a result of inward piston movement and electrical energy applied to the heater causes load to be transmitted to the moulds. Initially, axial shortening of the cell causes pressure increase resulting in a reduction in mould height.

Stage 2

As pressure and temperature are further increased a quasi-hydrostatic pressure environment is developed within the cell, resulting in relatively uniform compression of the moulding material, thus the mixture, begins. As the pressure is further elevated, the mixture is progressively densified, firstly by compaction of the surface that is in contact with the moulding material and then progressively inward to the center of the charge. Further, due to internal friction within the charge a pressure gradient is generated within the mixture thus producing comparatively lower compaction toward the central region of this charge.

Ultimately, the charge surface is fully compacted and thus resists any further compression because of the self-supporting framework of diamond coating the outer surface of the charge.

Finally, once reaction has been completed (sintering at 1470–1500 degrees) the diamond to silicon carbide content of the surface layer is higher than that of the interior.

Figure 6:
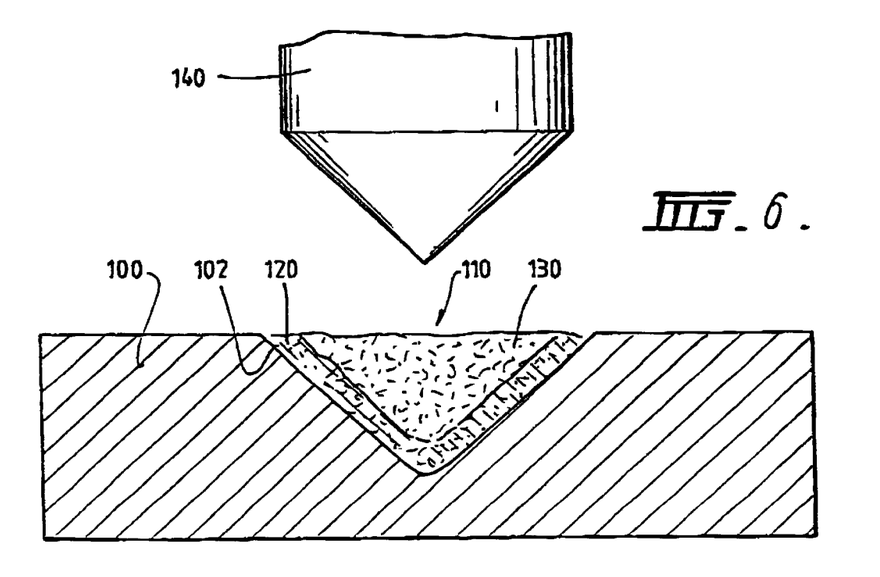
FIG. 6 is a cross-sectional view through a shaped mould showing a further embodiment of the invention.

Another example of producing the articles of FIGS. 5a and 5b such as a cone or a dome for forming a tip of a mining machine, will now be described with reference to FIG. 6. The cone is formed in a mould 100 which may be similar to the mould described with reference to FIG. 3 which has a cavity 102 defining a generally conical shape. The charge 110 comprises a first mixture 120 of particulate diamond/silicon/silicon nitride material and a second mixture 130 of such materials. The mixture 120 includes finer diamond particles mixed with silicon powder/silicon nitride and second mixture 130 includes coarser diamond particles mixed with silicon powder. The mixture 120 is laid against the surface of the mould cavity 102 and will form the outer surface of the article which is moulded, namely the mining tip according to this embodiment of the invention. The second mixture 130 will form the interior core.

A shaped tamping rod 140 is used to lay mixture 120 against the surface of the mould cavity 102; mixture 130 is then loaded into the core cavity formed by the tamping rod 140.

The preferred moulding technique described with reference to FIG. 6 will be described in further detail with reference to the following examples in which two feedstocks (instead of one as is the case in Example 1) are used:

EXAMPLE 2

A mixture comprising 80 percent of 20–30 micron and 20 percent 10–20 micron diamond was also prepared. This mixture was further intimately mixed with 1–2 micron silicon powder and silicon nitride powder in the proportions by weight comprising 90 percent diamond to 9.5 percent silicon and 0.5 percent silicon nitride.

A second coarser mixture comprising 80 percent of 40–60 micron and 20 percent 20–30 micron diamond was prepared. This mixture was further intimately mixed with 1–2 micron silicon powder and silicon nitride powder in the proportions by weight comprising 90 percent diamond to 9.5 percent silicon and 0.5 percent silicon nitride.

Two cylindrical moulds of hexagonal boron nitride with performed, conical shaped recesses were prepared. The circular opening diameter of these conical recesses was 14 mm and their depth was 11 mm, the tapering sides of which formed an included angle of 78 degrees.

The finer diamond—silicon mixture was then packed into the recess using a tamping rod with a conical shaped end section. This conical shaped end section had a diameter of 10 mm and a height of 9 mm, in addition it had a concentrically shaped shoulder at its base which allowed central location within the mould cavity. The use of this tool provided within the mould cavity a 2 mm thick lining of the coarser diamond—silicon mixture and a central unfilled core. The core region was then filled with the coarser diamond—silicon mixture and tamped firmly into place with a second, flat faced tamping rod. Finally, when the recess was largely filled, a silicon disk of 14 mm diameter was placed into the recess so as to bring the filled recess flush with surface of the mould. The resultant charged moulds were placed into a pressure coil similar to the type illustrated and described herein and subjected to high temperature and pressure in a piston cylinder apparatus.

The temperature of the cell and diamond—silicon charge was raised to 600 degrees centigrade and the pressure was slowly elevated to 6 Kb. The temperature and pressure were then raised simultaneously to a temperature of 1050 degrees C and a pressure of 10 Kb. The temperature was then held and the pressure raised to 25 Kb. Once at pressure the temperature was then raised slowly to 1500 degrees C and held for 15 minutes. The temperature was then decreased and held at a level of 800 degrees C, the pressure was then released to ambient conditions over 4 minutes. Temperature was then lowered over 8 minutes to room temperature.

After the cycle was complete the cell was removed from the apparatus and the samples examined. The mixture was found to have formed into a well consolidated conical shaped diamond compact, which displayed good mechanical properties. The density of the so formed, shaped compact was 3.40 gms/cc.

The cone was then cut vertically from its apex through to approximately the centre of its base using an EDM machine. One half was polished in order to observe the microstructure of the material. Inspection of this polished section using an optical microscope revealed that the outermost surface of the conical face comprised about 95 volume percent diamond and 5 volume percent silicon carbide in a layer about 0.5 mm in thickness. A second layer about 1 to 2 mm in thickness and in contact with the first layer contained about 75 volume percent of diamond in a holding matrix of silicon carbide. The core of the monolith contained about 70 volume percent of diamond in a bonding matrix of silicon carbide. All the layers were intimately connected and continuous with no evidence of microcracking or delamination. Further observations were carried out using a Scanning Electron Microscope, confirming the above results.

This radial variation in the diamond particle content of the composite body is conferred by non-uniform impregnation of the composite with molten silicon during its formation as well as by the P-F cycle as described in Example 1.

The second half of the cone was subsequently broken; it possessed excellent impact strength and hardness. When broken, the fractures were found to extend through the diamond crystals, showing the strength of the diamond—silicon carbide bonding. Subsequently x-ray analysis showed that the silicon to silicon carbide reaction was almost complete, only 1–2 percent of unreacted silicon and approximately 1 percent graphite being present after the reaction.

In subsequent abrasion test against hard rock cones made using the above procedure proved to be highly wear resistant and able to absorb very high impact or shock loads.

EXAMPLE 3

This example uses two feedstocks with identical grain sizes, but with different initial diamond:silicon content of 92.5% diamond and 7% silicon and 0.5% silicon nitride in the first feedstock and 90% diamond to 9.5% silicon and 0.5% silicon nitride in the second feedstock. The first feedstock forming the first mixture was applied to the mould to form the outer layer and the second feedstock forming the second mixture applied in the cavity formed by the first mixture. The mixtures were applied to the mould in the same manner as described with reference to Example 2 and a pressure and temperature cycle is applied to the mould in the same manner as described with reference to Example 2. A shaped composite article, having a thin diamond-enhanced skin underlaid by an enhanced diamond layer is produced which has characteristics similar to those described with reference to Example 2.

EXAMPLE 4

This example uses two feedstocks with different grain sizes and different initial diamond:silicon content. The diamond:silicon content may be the same as that described with reference to Example 3 and the grain size of 20 to 30 microns in one of the feedstocks and 40 to 60 microns in the other feedstock. The temperature and pressure cycle is the same as that described with reference to Example 2 was utilised and once again the feedstocks were applied to a mould in the same manner as described with reference to Example 2. Once again, a shaped composite articles is produced having a higher diamond particle content in the surface layer than the interior core of the article.

Since modifications within the spirit and scope of the invention may readily be effected by persons skilled within the art, it is to be understood that this invention is not limited to the particular embodiments described by way of example hereinabove.

What is claimed is:

1. A composite hard material article, including:

a body having a variable microstructure said microstructure being represented in an outer surface and an interior core, the body being formed from composite hard material including hard particles;

the body having a surface layer at the outer surface which has a higher hard particle content than the interior core thus forming a more closely packed hard particle network in the surface layer than in the interior core of the body; and the body being formed from a single substantially homogenous mixture of the composite hard material, and application of a temperature and pressure cycle to the mixture which densifies the mixture firstly by compaction of the surface layer and then compaction inwardly to the centre of the mixture with the establishment of a pressure gradient within the mixture to produce comparatively lower compaction towards the centre of the mixture so as to form the body, having the outer surface with the higher hard particle content than the interior core, from the single substantially homogenous mixture of the composite hard material.

2. The article of claim 1, wherein the composite hard material is polycrystalline diamond composite hard material in which the hard particles are formed from diamond, or polycrystalline cubic boron nitride hard material wherein the hard particles are formed from the cubic boron nitride.

3. A method of forming a composite hard material article, including a body having a variable microstructure said microstructure being represented in an outer surface and an interior core, the body being formed from composite hard material including hard particles, the body having a surface layer at the outer surface which has a higher hard particle content than the interior core thus forming a more closely packed hard particle network in the surface layer than in the interior core of the body the method; including locating single substantially homogenous mixture of the composite hard material into a mould;

applying temperature and pressure to the mould and the material within the mould within a cell by the application of a temperature and pressure cycle; and the application of the temperature and pressure cycle to the mixture densifying the mixture firstly by compaction of the surface layer and then compaction inwardly to the centre of the mixture with the establishment of a pressure gradient within the mixture to produce comparatively lower compaction towards the centre of the mixture so as to form the body, having the outer surface with the higher hard particle content than the interior core, from the single substantially homogenous mixture of the composite hard material.

4. The method of claim 3, wherein the composite hard material is polycrystalline diamond composite hard material in which the hard particles are formed from diamond, or polycrystalline cubic boron nitride hard material wherein the hard particles are formed from the cubic boron nitride.

5. A method of forming a hard material article, including the steps of:

loading a charge of hard composite material including hard particles into a mould, the mould having a mould surface and substantially defining the outer surface shape of the article;

applying temperature and pressure to the charge of material in the mould in such a manner so as to form at the outer surface a surface layer which includes a hard particle content greater than that of an interior core portion of the article thus forming a more closely packed hard particle network in the surface layer than in the interior core of the article; and the surface layer which includes a hard particle content greater than that of the interior core, being defined by the mould and being formed adjacent the entirety of the mould surface of the mould in which the charge of hard composite material is loaded.

6. The method of claim 5, wherein the application of temperature and pressure to the charge of material includes the steps of:

locating the mould containing the charge into a cell;

initial application of pressure and temperature causing load to be transmitted to the mould located in the cell to cause initial axial shortening of the cell to in turn cause pressure increase resulting in a reduction in the height of the mould;

further increasing pressure and temperature to create a quasi-hydrostatic pressure environment within the cell to create relative uniform compression of the material;

further increasing pressure so that the material is progressively densified firstly by compaction of the surface that is in contact with the mould and then progressively inward to the centre of the charge; and causing a pressure gradient to be generated within the charge thus producing comparatively lower compaction towards a central region of the charge.

7. The method of claim 6, wherein the charge comprises a single feedstock in which the hard particles are formed from diamond grit, comprising 80% of diamond grit of size 40 to 60 micron and mixed with 20% of diamond grit of size 20 to 30 micron.

8. The method of claim 3 wherein the charge has:

a first mixture having hard material particles and a second mixture having hard material particles, the first and second mixtures having identical initial hard particle content but with the second mixture having a grainsize which is coarser than the grain size of the hard particles in the first mixture;

the method further including packing the first mixture into the mould so as to be adjacent the mould surface to define a cavity which will define the interior core of the article;

filling the cavity with the second mixture; and placing the mould including the first and second mixtures into the cell and applying pressure and temperature to form the article.

9. The method of claim 3 wherein the charge has:

a first mixture of hard particles and a second mixture of hard particles, the first and second mixtures having different hard particle grainsizes and different initial hard particle content, the first mixture having a higher hard particle content and a finer grainsize;

and the method further includes packing the first mixture into the mould so as to be adjacent the mould's surface to define a cavity which will define the interior core of the article;

filling the cavity with the second mixture; and placing the mould including the first and second mixtures into the cell on applying pressure and temperature to form the article.

10. The method of claim 3, wherein the composite hard material is polycrystalline diamond composite hard material in which the hard particles are formed from diamond, or polycrystalline cubic boron nitrite hard material wherein the hard particles are formed from the cubic boron nitrite.

11. The method of claim 5 wherein the charge has:

a first mixture of hard particles and a second mixture of hard particles, the first and second mixtures having different hard particle grainsizes and different initial hard particle content, the first mixture having a higher hard particle content and a finer grainsize;

and the method further includes packing the first mixture into the mould so as to be adjacent the mould's surface to define a cavity which will define the interior core of the article;

filling the cavity with the second mixture; and placing the mould including the first and second mixtures into the cell and applying pressure and temperature to form the article.

12. The method of claim 5, wherein the composite hard material is polycrystalline diamond composite hard material in which the hard particles are formed from diamond, or polycrystalline cubic boron nitride hard material wherein the hard particles are formed from the cubic boron nitride.

13. A method for forming a composite hard material, including:

locating a charge of constituents of the composite material in a cell for the formation of the composite hard material;

increasing the temperature of the cell and the charge to a first temperature in excess of 800° C. and subjecting the charge to pressure to form the composite hard material; and reducing the temperature to a second temperature of about 800° C. after formation of the composite hard material, and once the second temperature has stabilised, rapidly reducing the pressure to ambient pressure over a period of about 4 minutes.

14. The method of claim 13, wherein the pressure is elevated to about 25 Kb during the formation of the composite hard material and the pressure is reduced rapidly from about 25 Kb to said ambient pressure.

15. The method of claim 13 or 14, wherein the temperature of the charge is raised to about 600° C. and pressure is increased to 6 Kb, the temperature and pressure are then increased simultaneously to a temperature of about 1050° C. and a pressure of about 10 Kb, the temperature is then held and pressure is raised to a maximum pressure of about 25 Kb, at about 25 Kb pressure, the temperature is slowly ramped to the sintering temperature and held for a predetermined period after which the temperature is again ramped slowly to the second temperature, once this temperature is stabilised, the pressure is then reduced to the ambient pressure over said period of about 4 minutes, and at about 0.5 to 1 Kb, the pressure bleed is slowed and the temperature ramped to ambient slowly over about 8 minutes.

16. A method of producing a hard composite material body, including:

locating a charge of material including hard particles and binder material in a mould having at least one shaped cavity having the shape of a finished product;

subjecting the mould and the charge of material to high temperature and pressure to form a composite hard material; and maintaining the charge subject to quasi-hydrostatic pressure during the application of pressure and high temperature, so that a shaped body is formed having the shape of the mould and which requires no substantial machining.

17. The method of claim 16, wherein the charge is maintained at a substantially low temperature gradient both axially and radially during formation of the composite so as to reduce internal stresses and minimise delamination.

18. The method of claim 16, wherein the mould having the shaped cavity is formed from graphite or hexagonal boron nitride or material with similar physical properties and a plurality of shaped cavities are formed in the mould.

19. The method of claim 12, wherein the shaped cavities are dome shaped or cone shaped for the formation of tips for a mining machine.

20. The method of claim 16 further including maintaining a low temperature gradient radially and axially across the charge during formation of the composite hard material to reduce internal stresses that might result in delamination.

21. A cell for forming a composite hard material, including:

a cell wall defining a central region for receiving the composite hard material;

the cell wall having;
(a) a ductile wall member;
(b) a heater for providing heat energy when electrical current is applied to the heater;
(c) means for maintaining a substantially low temperature gradient throughout the central region in which composite hard material is formed;
(d) a water barrier wall arranged inwardly of the ductile wall member and heater; and
(e) a barrier layer arranged inwardly of the water barrier wall for preventing intrusion of material from which the water barrier wall is formed into the composite hard material during formation of the composite hard material.

22. The cell of claim 21, wherein the means for maintaining a substantially low temperature gradient comprises a metal reflector formed from high melting point metal material arranged between the ductile wall member and the water barrier wall for reflecting radiant energy from the heater and also conducting heat energy axially towards ends of the cell.

23. The cell of claim 21, wherein the means for maintaining a substantially low temperature gradient may also include graphite spacers within the central region in which the hard material is located to alter the current density and improve thermal conductivity axially from the central region thereby aiding in the reduction of the thermal gradient caused by heater damage and by thermal conductivity.

24. The cell of claim 21, wherein the water barrier wall comprises a glass wall which also serves to enhance even pressure distribution and create a quasi-hydrostatic environment within the cell.

25. The cell of claim 21, wherein the heater comprises a high melting point material such as graphite or molybdenum.

26. The cell of claim 21 wherein the barrier layer comprises titanium foil or similar material.

27. The cell of claim 21, wherein the ductile wall is formed from talc or other material which provides good thermal and electrical insulation, the ductile wall also assists in creation of the quasi-hydrostatic environment within the cell to ensure even pressure distribution over the hard material during formation of the composite material.

28. A method of forming a composite hard material including locating a charge of composite constituents into a cell according to claim 21 and applying electric current to the heater to heat the charge and applying pressure to pressurise the charge to thereby form the composite hard material.

* * * * *